United States Patent
Lair et al.

(10) Patent No.: US 10,136,467 B2
(45) Date of Patent: Nov. 20, 2018

(54) MOBILE TERMINATED CONTROL METHOD AND RELATED NETWORK DEVICES

(75) Inventors: Yannick Lair, Berkshire (GB); Iskren Ianev, Berkshire (GB)

(73) Assignee: Lenovo Innovations Limited (Hong Kong), Hong Kong (CN)

(*) Notice: Subject to any disclaimer, the term of this patent is extended or adjusted under 35 U.S.C. 154(b) by 590 days.

(21) Appl. No.: 13/577,084

(22) PCT Filed: Feb. 21, 2011

(86) PCT No.: PCT/JP2011/054417
§ 371 (c)(1),
(2), (4) Date: Oct. 10, 2012

(87) PCT Pub. No.: WO2011/102560
PCT Pub. Date: Aug. 25, 2011

(65) Prior Publication Data
US 2013/0040658 A1 Feb. 14, 2013

(30) Foreign Application Priority Data

Feb. 22, 2010 (GB) .................................. 1002892.6

(51) Int. Cl.
*H04W 24/00* (2009.01)
*H04W 76/25* (2018.01)
*H04W 68/12* (2009.01)

(52) U.S. Cl.
CPC ............ *H04W 76/25* (2018.02); *H04W 68/12* (2013.01)

(58) Field of Classification Search
USPC ....................................................... 370/331
See application file for complete search history.

(56) References Cited

U.S. PATENT DOCUMENTS

| 2007/0223409 A1* | 9/2007 | Herrero ............... H04W 76/022 370/310 |
| 2007/0238452 A1* | 10/2007 | Haviala ................. H04W 76/04 455/418 |
| 2010/0202413 A1* | 8/2010 | Vikberg ............ H04W 36/0022 370/332 |

FOREIGN PATENT DOCUMENTS

| CN | 1853435 A | 10/2006 |
| CN | 1939001 A | 3/2007 |

(Continued)

OTHER PUBLICATIONS

3GPP TS 23.018 V7.7.0, Sep. 2008, 3rd Generation Partnership Project; Technical Specification Group Core Network and Terminals; Basic call handling; Technical realization(Release 7), pp. 17-19.*

(Continued)

*Primary Examiner* — German Viana Di Prisco
(74) *Attorney, Agent, or Firm* — Kunzler, PC

(57) ABSTRACT

The invention provides for a method of controlling a mobile terminated procedure between a mobile terminal device and a network node device of a mobile radio communications network, and to a related terminal device, and particularly concerning a change in network node connection as part of a Circuit Switched Fallback procedure, and including the step of transmitting a connection-maintaining request such as a follow-on-request from the terminal device to the network node device during the mobile terminated procedure and seeking to maintain connectivity with the network node device so as to allow for a post location update procedure arriving from the network.

24 Claims, 3 Drawing Sheets

(56) References Cited

FOREIGN PATENT DOCUMENTS

| CN | 101179561 A | 5/2008 |
|---|---|---|
| GB | 2 455 706 A | 6/2009 |
| JP | 2007-208554 A | 8/2007 |
| WO | 01/03463 A1 | 1/2001 |
| WO | 2005/076538 A1 | 8/2005 |
| WO | 2008/033951 A2 | 3/2008 |
| WO | 2009/095777 A1 | 8/2009 |
| WO | 2010/016491 A1 | 2/2010 |

OTHER PUBLICATIONS

3rd Generation Partnership Project; Technical Specification Group Services and System Aspects; Circuit Switched Fallback in Evolved Packet System; Stage 2 (Release 9), 3GPP TS 23.272, Dec. 2009, pp. 30-31, V9.2.0.

"3rd Generation Partnership Project; Technical Specification Group Core Network and Terminals; Mobile Radio Interface Layer 3 Specification; Core Network Protocols; Stage 3 (Release 9)", 3GPP TS 24.008, Dec. 2009, pp. 1-587, V9.1.0.

"3rd Generation Partnership Project; Technical Specification Group Core Network and Terminals; Mobile Radio Interface Layer 3 Specification; Core Network Protocols; Stage 3 (Release 8)"; 3GPP TS 224.008, Dec. 2009, pp. 1-595, V 8.8.0.

"3rd Generation Partnership Project; Technical Specification Group Service and System Aspects; Circuit Switch Fallback in Evolved Packet System; Stage 2 (Release 8)"; 3GPP TS 23.272, Dec. 2009; pp. 1-54, V8.6.0.

"MT CSFB Roaming Retry Potential Issue", SA WG2 Temporary Document, Feb. 22-26, 2010, pp. 1-3, 3GPP TSG SA WG2 Meeting #78.

Communication dated Jul. 2, 2014, from the State Intellectual Property Office of the People's Republic of China in counterpart Chinese Application No. 201180008144.6.

3GPP TSG-SA WG2 Meeting #78, S2-101302, Feb. 22-26, 2010, San Francisco, USA, Change Request 23.272 CR 0198, rev5, current version 9.2.0, pp. 1-9/e.

3GPP TSG-SA WG2 Meeting #78, S2-101303, Feb. 22-26, 2010, San Francisco, USA, Change Request 23.272 CR 0195, rev4, current version: 8.6.0, pp. 1-13e.

* cited by examiner

- PRIOR ART -

MOBILE TERMINATED CONTROL METHOD AND RELATED NETWORK DEVICES

CROSS REFERENCE TO RELATED APPLICATIONS

This application is a National Stage of International Application No. PCT/JP2011/054417 filed on Feb. 21, 2011, which claims priority from British Patent Application No. 1002892.6, filed on Feb. 22, 2010, the contents of all of which are incorporated herein by reference in their entirety.

TECHNICAL FIELD

The present invention relates to a Mobile Terminated control method and to related network devices and to control scenarios employed in relation to mobile terminated signalling when the mobile terminal moves between different communication systems whether for simple handover requirements or, as a particular example, as part of a Circuit Switched Fallback (CSFB) procedure.

BACKGROUND ART

Due to the nature of a mobile radio communications network, such as a cellular network, there often arises a requirement for a mobile terminal device such as so-called User Equipment mobile phone handset to change its operational connectivity, whether due to a handover between cells and/or a handover between networks and related communication systems.

In view of the variety of communication systems, and in particular legacy communication systems, that are in existence, to optimise connectivity and to minimize limiting effects on handset terminal performance, functionality allowing movement between different systems can provide particular advantageous.

SUMMARY OF INVENTION

However, in view of the requirements of such different systems, it is often disadvantageously found that noticeable delays arise when both seeking to switch between such systems and subsequently establishing connectivity within the new system. Particularly when considering the paging signalling requirements arising between the mobile terminal and the currently registered network node, and the target network node, it is found that connectivity can be inappropriately surrendered and/or lost. In some scenarios, the ongoing operation of the mobile terminal will not readily allow for re-establishment of that connection and so service interruption is a further potential problem.

The present invention seeks to provide for a control method relating to mobile terminated signalling, and to related network devices and having advantages over known such methods and devices.

As a further illustration, according to current 3GPP Rel-8 and Rel-9 specifications, when the User Equipment (UE) moves to legacy 2G/3G systems from, for example, an Evolved Packet System (EPS) which will generally be for Circuit Switched Fallback (CSFB) purposes, the UE may be required to move to a Location Area (LA), and related network node, different from the LA and network node where the UE is currently registered.

With reference in particular to CSFB functionality known from the above-mentioned 3GPP specifications, it is possible for the UE to register to the CS domain via the combined registration procedure in, for example, E-UTRAN. This advantageously allows the UE to be accessible for CS services and in this scenario the paging of the UE is achieved by way of paging from the Mobile Switching Centre/Visitor Location Register (MSC/VLR) on the SGs interface between the MSC/VLR and the Mobility Management Entity (MME). Subsequent to the UE having been paged, the UE will make a request for the CSFB procedure via the MME and the MME will then act so as to trigger the CSFB procedure by moving the UE to, for example, the legacy GERAN or UTRAN system.

However, with, for example, the UE connected in a first cell, it is registered via the SGs to a first MSC with a first Location Area Identity (LAI) wherein the first LAI is determined on the basis of a Tracking Area Identity (TAI)/LAI mapping table of the MME. Subsequently, and at the time of the required CSFB procedure, the network node, such as an eNB, may determine that it is more appropriate to connect the UE to a target cell that is associated with a different, i.e. second, LAI and which also belongs to a respective second MSC. The hand-over of the UE in this manner to a different cell can arise, first, when the network uses different MSCs for 2G and 3G systems and since the MME maps the TAI to only one LAI, the MME must decide whether to allocate a LAI from the 2G-MSC or from the 3G-MSC. If it is assumed that the MME maps the TAI to the LAI of the 2G system, it is possible that the UE could enter a 3G LA if coverage is perceived to be greater within the 3G system. In the alternative of course, if the TAI is mapped to the LAI of the 3G system, it is then possible that the UE could enter a 2G LA for perceived improved coverage.

Secondly, considering that Tracking area (TA) and LA are independent, it is quite common for misalignments to arise between TA/LA borders since network operators find such alignment difficult to achieve.

It is further known from the 3GPP technical specification TS 23.272 that with some scenarios such as those noted above requiring movement of the UE to a LA not belonging to the MSC of current registration, that a so-called "roaming retry" procedure can be employed at the time the UE performs its Location Update (LU) procedure.

Within this procedure, Mobile Terminated (MT) communications signalling will arise and the UE will look to receive call setup from the MSC after performing LU. However, currently there is a relatively high risk that any such ongoing Mobile Terminated (MT) communications signalling will fail subsequent to completion of the LU procedure.

Disadvantageous delays will then arise as the MSC again seeks to page the UE and, further, it is possible that the paging may fail if, in the meantime, the UE may have reselected, for example, a LTE cell.

The general background relating to the invention is discussed further in 3GPP discussion document S2-101441.

The present invention in particular seeks to provide for a Mobile Terminated control procedure, and related network devices such as mobile terminal devices and network node devices, offering advantages over such known procedures and devices.

According to a first aspect of the present invention there is provided a method of controlling a mobile terminated procedure between a mobile terminal device and a network node device of a mobile radio communications network, and including the step of transmitting a connection-maintaining request from the terminal device to the network node device during the mobile terminated procedure and seeking to maintain connectivity with the network node device.

Advantageously, therefore, by transmitting a connection-maintaining request from the terminal device during the mobile terminated procedure, the network node device is made aware of a need to maintain the connection with the mobile terminal device and so knows not release its connection with the mobile terminal device subsequent to completion of the LU procedure, thereby reducing the risk of failure of the mobile terminated procedure.

The invention can prove particularly advantageous when the network node device comprises a target network node device.

Advantageously, the connection-maintaining request is provided during a location update procedure.

In one arrangement, the connection-maintaining request is transmitted after fallback to a network node of a second communication system.

Preferably, the said second communication system comprises a circuit switched communication system.

Yet further, the said connection-maintaining request is transmitted after the terminal device has been paged by a current first communication system. Preferably, the said current first communication can comprise a E-UTRAN system.

The said connection-maintaining request can comprise a follow-on-request.

In particular, the connection-maintaining request from the terminal device is transmitted responsive to a determination that a network-originating procedure will arrive from the network subsequent to a location update procedure.

According to a further aspect of the present invention, there is provided a mobile terminal device arranged to operate within a mobile radio communications network and arranged for mobile terminated communication with a network node device, the terminal device being arranged to transmit a connection-maintaining request to the network node device during a mobile terminated procedure and seeking to maintain connection with the network node device.

The terminal device can be advantageously arranged to provide the said connection-maintaining request during a location update procedure. Further, the request can be transmitted after a fallback procedure to a node device of a second communication system, and the said second communication system can comprise a circuit-switched system.

As noted above in relation to the method of the present invention, the request can be transmitted subsequent to paging from the current first communication system and which can advantageously comprise a E-UTRAN system.

Advantageously, the terminal device is arranged to transmit a follow-on-request as the said connection-maintaining request.

Also therefore, the terminal device is advantageously arranged to transmit the connection-maintaining request responsive to a determination that a network-originating procedure will arrive from the network and subsequent to a location update procedure.

According to yet a further aspect of the present invention, there is provided a network node device arranged to receive a connection-maintaining request from a mobile terminal device during a mobile terminated procedure, and to be controlled by the same so as to maintain connectivity with the said terminal device for an implementation dependent time.

Of course, it will be appreciated that the said network node device can be arranged to receive the connection-maintaining request from a terminal device as defined above.

It should also be appreciated that the present invention can comprise a computer program product, and a computer readable medium bearing such a product, the computer program product comprising computer-readable instructions for carrying out the method as defined above.

It should be appreciated that the various aspects of the present invention as outlined above advantageously allow for the network to readily receive an indication from a mobile terminal device during a mobile terminated procedure to maintain connectivity such that, for example, once a Initial Address Message (IAM) arrives at the network node, the mobile terminating communication can be set up on the existing connection between, for example, the MSC and the UE. There is then advantageously no need for any repeat-paging, nor any associated call failure.

Advantageously, the present invention can be arranged to re-use the "follow-on-request" indicated at present in location update messaging and as apparent from, for example, 3GPP TS 24.008.

Also, the above Technical Specification defines legacy behaviour in which, upon receipt by the network of a "follow-on request" from the MS, the network can respond with a "follow-on proceed" and which can be adopted within the present invention as required.

BRIEF DESCRIPTION OF DRAWINGS

The invention is described hereinafter by way of example only, with reference to the accompanying drawings in which.

DESCRIPTION OF EMBODIMENTS

Figure 1:
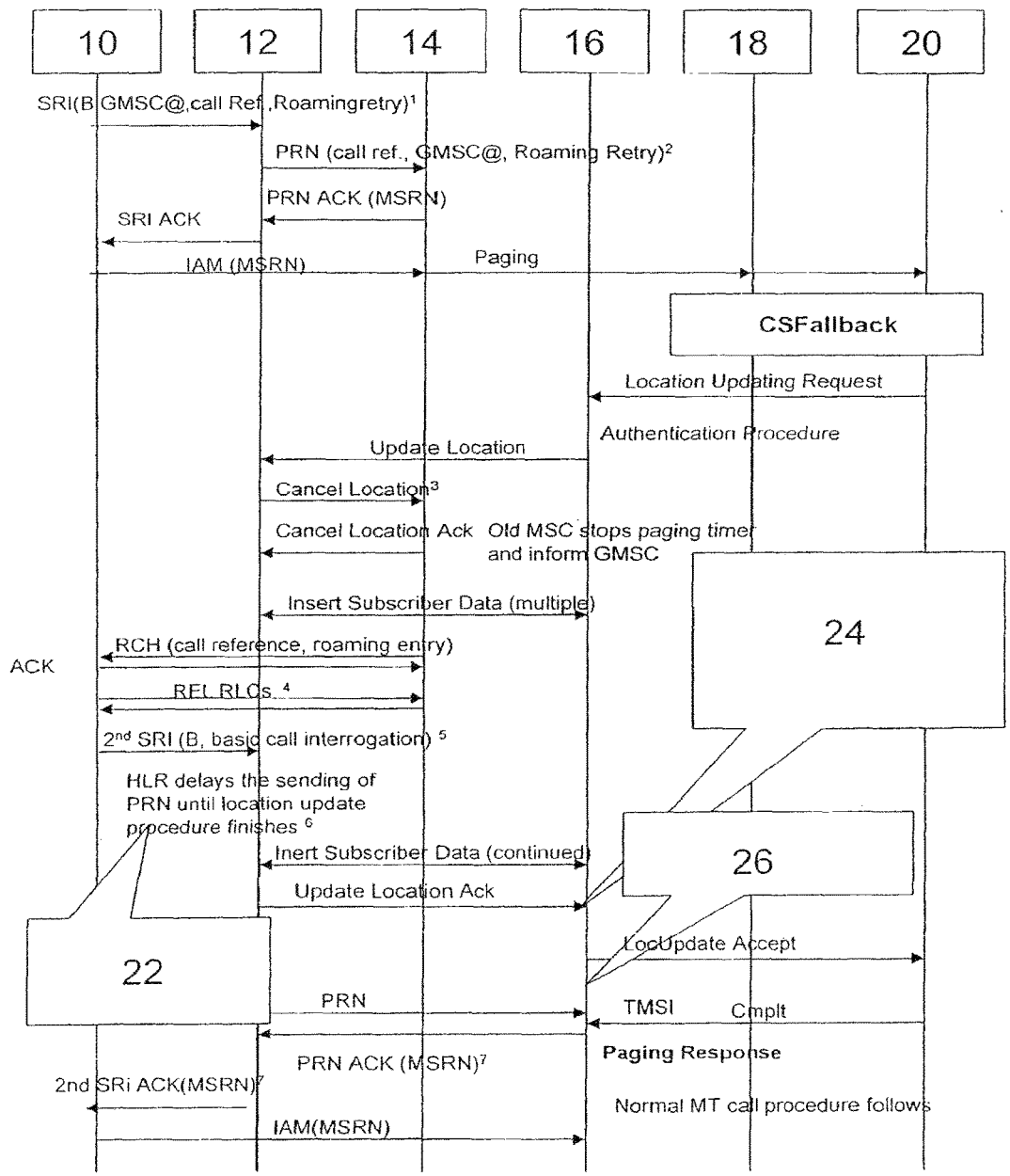
FIG. 1 is a signalling diagram illustrating an example of potential problems that can arise in the current art and that can be addressed by the present invention.

Turning first to FIG. 1, there is provided an illustration of a typical signalling pattern arising in relation to a CSFB procedure involving movement of a mobile terminal device such as a Mobile Station (MS) from, for example a current (soon to be old) network node such as a MSC to a new MSC and which leads to a roaming retry procedure such of that discussed above and as specified in 3GPP TS 23.272. FIG. 1 illustrates in particular the potentially disadvantageous issues arising in relation to subsequently and which are addressed by the present invention.

As noted, FIG. 1 illustrates the signalling arising in accordance with a CSFB procedure and illustrates signalling arising between a Gateway Mobile Switching Centre (GMSC) 10, a Home Location Register (HLR) 12, an "old" Mobile Switching Centre (MSC1) 14, a "new" Mobile Switching Centre (MSC2) 16, and by way of System Architecture Evolution/Long Term Evolution (SAE/LTE) connectivity, a network terminal device in the form of a Mobile Station 20.

As illustrated, Send Routing Information (SRI) and Provide Roaming Number (PRN) signalling is exchanged between the GMSC 10, the HLR 12 and MSC1 14 and which eventually leads to a paging signal to the MS 20 as initiated by an Initial Address Message including a Mobile Station Roaming Number MSRN. The paging signal is delivered to the MS 20 product to initiation of CSFB and which procedure leads to a LU request from the MS 20. An authentication procedure then commences involving new MSC2 16 and the HLR 12, and old MSC1 14 and the GMSC 10 although as noted at 22 the Mobile Terminated call establishment is delayed by the HLR 12 waiting completion of the LU procedure.

Insert Subscriber Data signalling continues between the HLR 12 and new MSC2 16 until Update Location acknowledge/LU accept signalling can be delivered to new MSC2 16 and MS 20 respectively. However, and as indicated at 24, at this stage, new MSC2 16 does not know that there is an ongoing Mobile Terminated call and MSC2 16 can therefore send a LU Accept signal to the MS 20 immediately after receiving the Update Location acknowledgments and illustrated at 24.

As further indicated at 26, subsequent to the LU Accept signalling from MSC2 16 to the MS 20, the MSC2 16 is unaware that there is an incoming call such that there is a strong likelihood that the MSC2 16 might release the connection having a disadvantageous effect on the signalling, connectivity and thus operability.

That is, with the MSC2 16 releasing the connection, a further paging signal would have to be directed to the MS 20 when the IAM message arrives at the MSC. Delays and inefficiencies then arise. In particular, with CSFB, the MS 20 is first paged in E-UTRAN via the SGs and then the MS 20 is moved by the network to the GERAN or UTRAN system as required. The MS 20 performs a LU procedure if it is in a new Location Area, such that then the MT call can be processed. As will therefore be appreciated, such a sequence in any case exhibits some delay and so any further delay, such as that arising from the necessity for re-paging, should be avoided.

Such repeated paging requirement is itself disadvantageous in introducing additional delay to the CSFB procedure, but these limitations can be further exasperated since, with the MS 20 also having a E-UTRAN capability, the MS 20 will have reselected a LTE cell such that, in any case, the repeated paging will fail.

Figure 2:
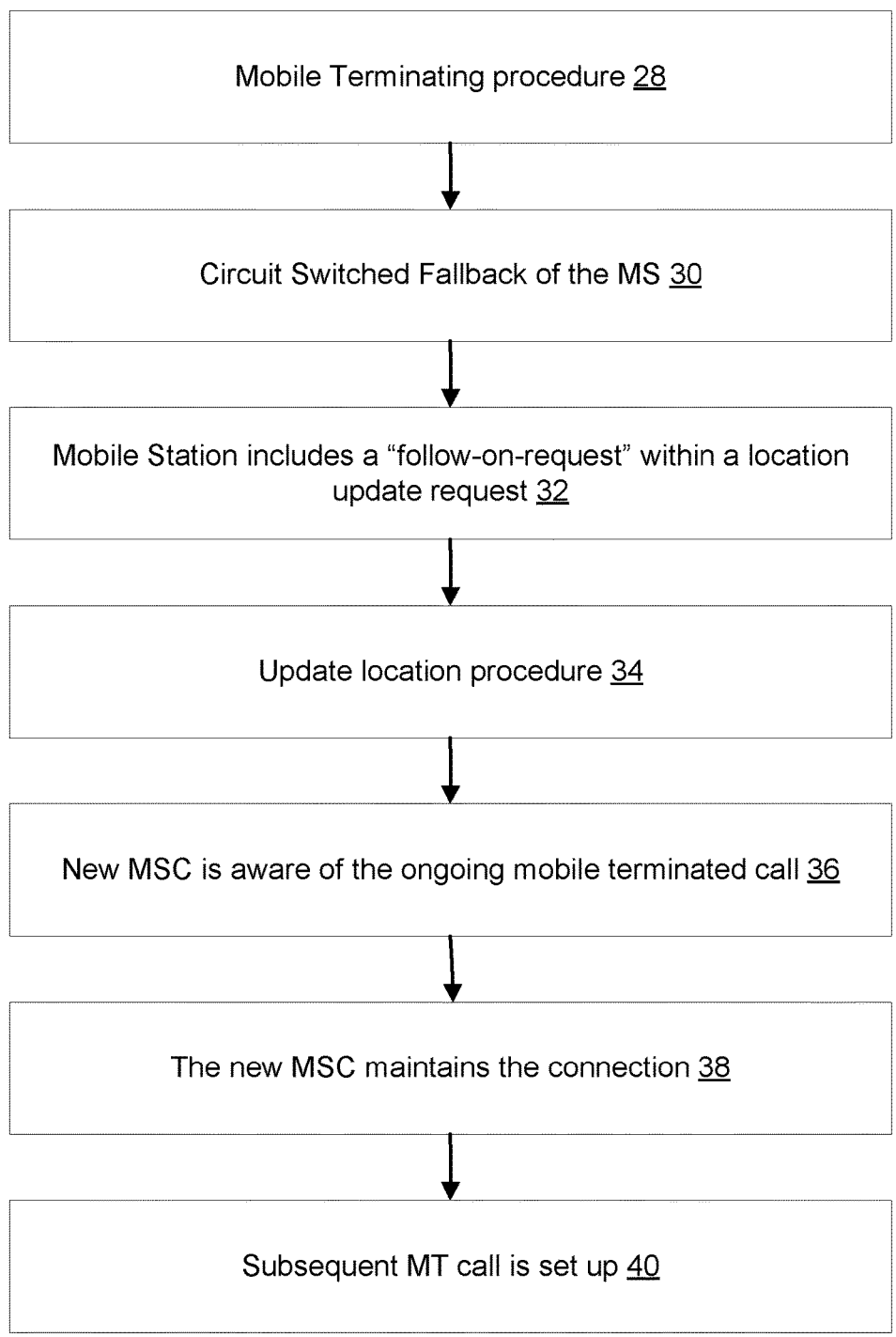
FIG. 2 is a flow diagram illustrating aspects of a control method according to an embodiment of the present invention.

Turning now to FIG. 2, there is provided a flow diagram illustrating control operation exhibited during a MT procedure and according to an embodiment of the present invention.

Thus, as part of a Mobile Terminating procedure 28, and with CSFB 30 requiring movement of the MS 20 of FIG. 1 to the new MSC2 16 of FIG. 1, the MS 20 includes within its LU request 32 a "follow-on-request" which serves to indicate that the connection with MSC2 16 should be retained and so not released as would otherwise be the case and as illustrated in FIG. 1. At step 34 the update location procedure continues but, in this scenario, the new MSC2 16 is aware at 36 that there is an ongoing MT call and said it maintains the connection at 38 such that the subsequent MT call is set up at 40 and after the IAM messaging on the existing connection.

The delays and possible call failures experienced in the current art can therefore advantageously be avoided.

Figure 3:
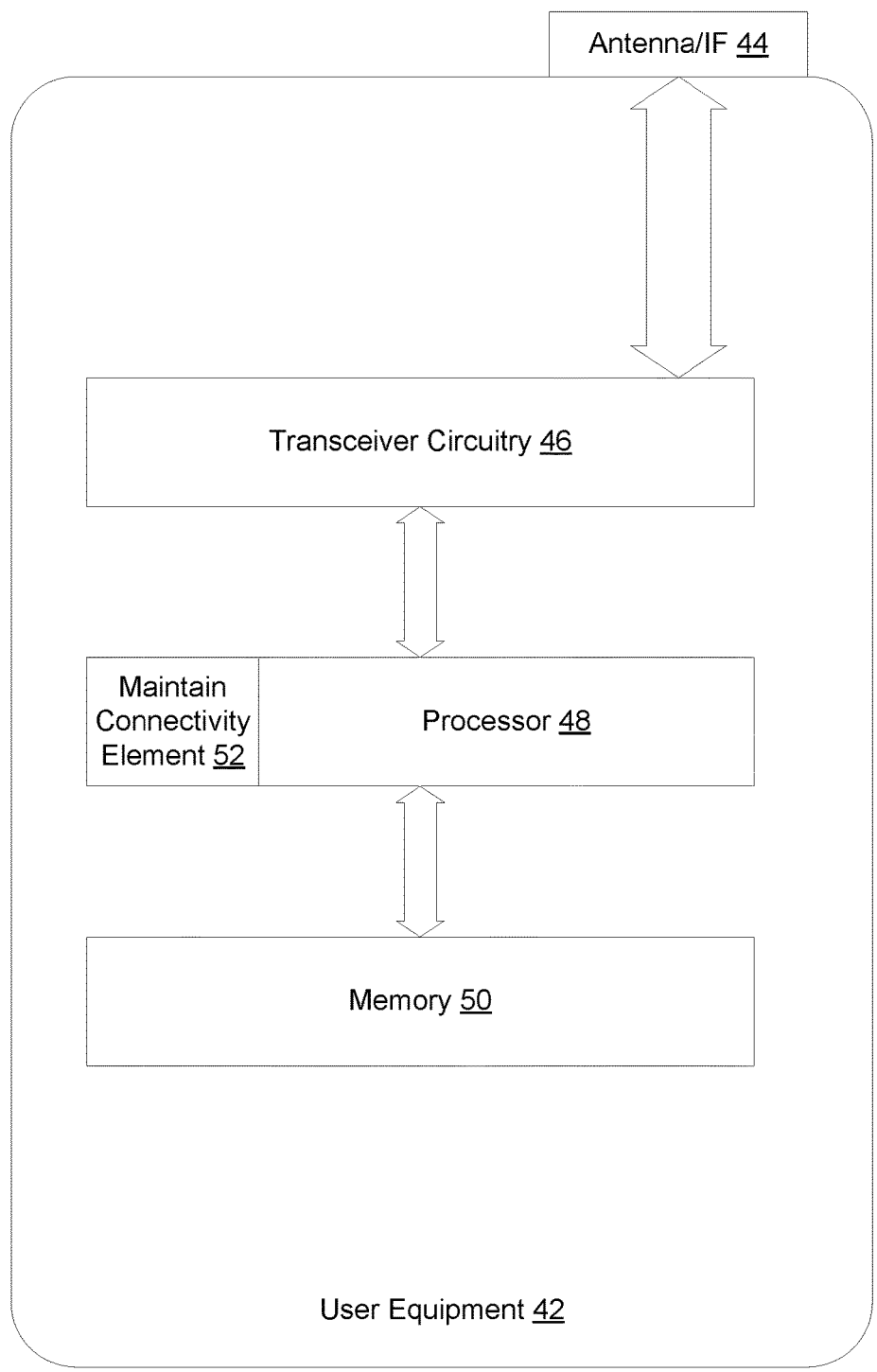
FIG. 3 is a schematic block diagram of a mobile terminal device according to an embodiment of the present invention.

With regard to FIG. 3, there is provided a schematic block diagram of a mobile station such as, for example a User Equipment handset device 42 with an antenna/interface 44 in operative connection with transceiver circuitry 46 which in turn, in a standard manner, connects to processor 48 and memory 50 functionality within the handset 42.

In accordance with the present invention, the processing functionality 48 within the handset 42 is arranged so as to include a "maintain connectivity" element 52, such as a "follow-on-request" [FOR] which is transmitted from the handset 40 during the LU request procedure so as to provide the required indication to the new MSC, i.e. MSC2 16 of FIG. 1 the connection is to be maintained and used for subsequent call setup.

As will be appreciated, such functionality can be provided within the handset 42 by appropriate specific circuitry and/or through the use of appropriate computer program element as retrieved from any appropriate storage medium.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from UK Patent Application No. 1002892.6 filed on Feb. 22, 2010, the content of which is incorporated by reference.

The invention claimed is:

1. A method of controlling a mobile terminated procedure between a mobile terminal device and a network node device of a mobile radio communications network, and comprising:
   determining that a location update procedure is required while the mobile terminal device is connected to a packet switched communication system;
   connecting to a circuit switched communication system containing the network node device; and
   transmitting a connection-maintaining request from the terminal device to the network node device within a location update request, the connection-maintaining request indicating to maintain connectivity with the network node device in the circuit switched communication system subsequent to completion of the location update procedure,
   said connection-maintaining request comprising an indication of an ongoing mobile terminated call in the packet switched communication system.

2. A method as claimed in claim 1, wherein the network node device comprises a target network node device.

3. A method as claimed in claim 1, further comprising performing the location update procedure in response to receiving a paging message.

4. A method as claimed in claim 1, wherein the connection-maintaining request is transmitted after fallback to a network node of a second communication system.

5. A method as claimed in claim 4, wherein the said second communication system comprises a circuit switched communication system.

6. A method as claimed in claim 1, wherein the said connection-maintaining request is transmitted after the terminal device has been paged by a current first communication system.

7. A method as claimed in claim 6, wherein the said current first communication system comprises an E-UTRAN system.

8. A method as claimed in claim 1, wherein the said connection-maintaining request comprises a follow-on-request.

9. A method as claimed in claim 1 and wherein the connection-maintaining request from the mobile terminal device is transmitted responsive to a determination that a network-originating procedure will arrive from the network subsequent to a location update procedure.

10. A mobile terminal device arranged to operate within a mobile radio communications network and arranged for mobile terminated communication with a network node device, the terminal device being arranged to:
- determine that a location update procedure is required while the mobile terminal device is connected to a packet switched communication system;
- connect to a circuit switched communication system containing the network node device; and
- transmit a connection-maintaining request to the network node device within a location update request, the connection-maintaining request indicating to maintain a connection with the network node device in the circuit switched communication system subsequent to completion of the location update procedure, said connection-maintaining request comprising an indication of an ongoing mobile terminated call in the packet switched communication system.

11. A terminal device as defined in claim 10 and arranged to perform the location update procedure in response to receiving a paging message.

12. A terminal device as defined in claim 10, and arranged such that the request is transmitted after a fallback procedure to a node device of a second communication system.

13. A terminal device as defined in claim 10, and arranged such that the request is transmitted subsequent to paging from the current first communication system.

14. A terminal device as claimed in claim 13, and wherein the current first system comprises an E-UTRAN system.

15. A terminal device as defined in claim 10 and arranged to transmit a follow-on-request as the said connection-maintaining request.

16. A terminal device as defined in claim 10, and arranged to transmit the connection-maintaining request responsive to a determination that a network-originating procedure will arrive from the network and subsequent to a location update procedure.

17. A network node device in a circuit switched communication system of a mobile radio communication network, the network node device arranged to:
- receive a connection-maintaining request from a mobile terminal device within a location update request,
- the connection-maintaining request indicating to maintain a connection with the network node device subsequent to completion of the location update procedure, said connection-maintaining request comprising an indication of an ongoing mobile terminated call in the packet switched communication system,
- wherein the network node device maintains connectivity with the terminal device subsequent to completion of a location update procedure in response to the connection-maintaining request.

18. A network node device as claimed in claim 17, and wherein the network node device receives the connection-maintaining request in response to the mobile terminal device performing a fallback procedure to the circuit switched communication system from a packet switched communication system.

19. A method performed by a mobile terminal device, of maintaining connectivity during a mobile terminated procedure during which procedure a location or tracking area changes, the method comprising:
- determining that a location update procedure is required while the mobile terminal device is connected to a packet switched communication system;
- generating signalling to initiate the location update procedure with a network node device in a circuit switched communication system, said signalling comprising a message to request update of the location or tracking area, said message to request update of the location or tracking area comprising an indication of an ongoing mobile terminated call in the packet switched communication system and that the connectivity with the network node device in the circuit switched communication system is to be maintained subsequent to completion of the location update procedure; and
- transmitting said indication of an ongoing mobile terminated call in the packet switched communication system and that the connectivity with the network node device in the circuit switched communication system is to be maintained to the network node device, whereby said network node device is able to maintain said connectivity in response to receiving said indication.

20. A method as claimed in claim 19 further comprising completing a circuit switched fall back procedure prior to generating said signalling to initiate the location update procedure.

21. A method as claimed in claim 19 further comprising receiving a paging message prior to generating said signalling to initiate the location update procedure.

22. A method as claimed in claim 21 wherein said paging message is received from a network node that is different to the network node to which said generated signalling is to be transmitted.

23. A method as claimed in claim 22 wherein said paging message is received from a node of an E-UTRAN system.

24. A mobile terminal device comprising:
- means for determining that a location update procedure is required while the mobile terminal device is connected to a packet switched communication system;
- means for generating signalling to initiate the location update procedure with a network node device in a circuit switched communication system, said signalling comprising a message to request update of the location or tracking area, said message to request update of the location or tracking area comprising an indication of an ongoing mobile terminated call in the packet switched communication system and that the connectivity with the network node device in the circuit switched communication system is to be maintained subsequent to completion of the location update procedure; and
- means for said indication of an ongoing mobile terminated call in the packet switched communication system and that the connectivity with the network node device in the circuit switched communication system is to be maintained to the network node device, whereby said network node device is able to maintain said connectivity in response to receiving said indication.

* * * * *